S. V. BROCK.
PLANTER.
APPLICATION FILED JULY 24, 1912.
1,074,240.
Patented Sept. 30, 1913.
2 SHEETS—SHEET 1.
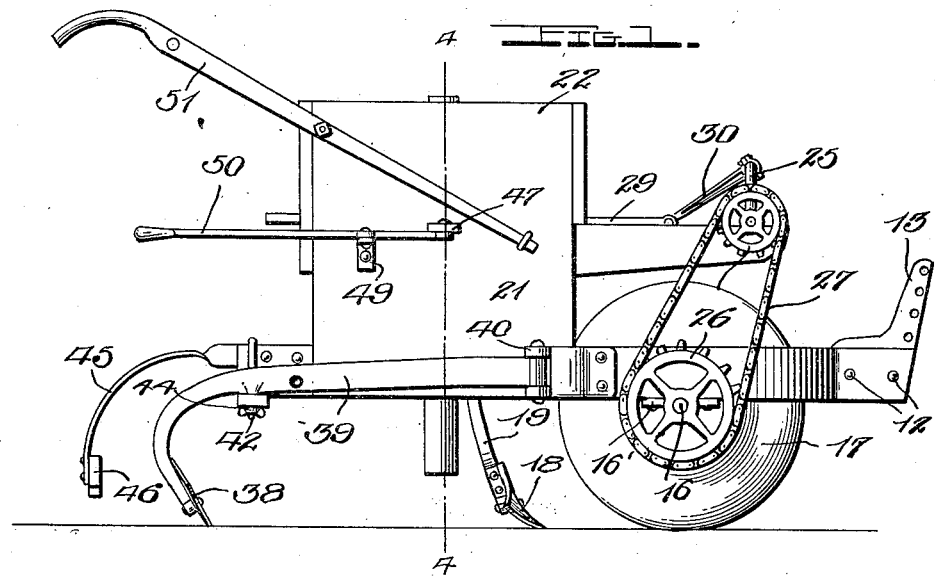
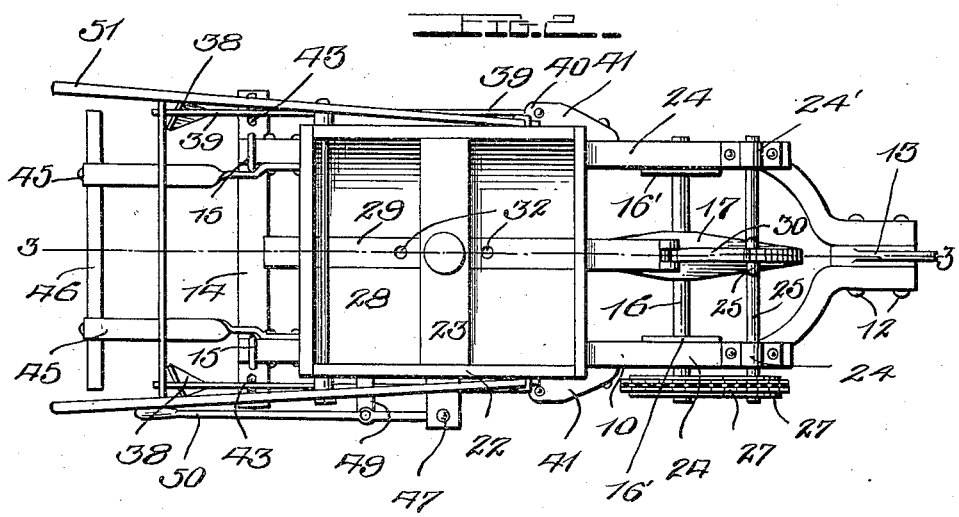
Witnesses
Chas. L. Griesbauer.
A. B. Norton.
Inventor
S. V. Brock,
By Watson E. Coleman
Attorney S. V. BROCK.
PLANTER.
APPLICATION FILED JULY 24, 1912.
1,074,240.
Patented Sept. 30, 1913.
2 SHEETS—SHEET 2.
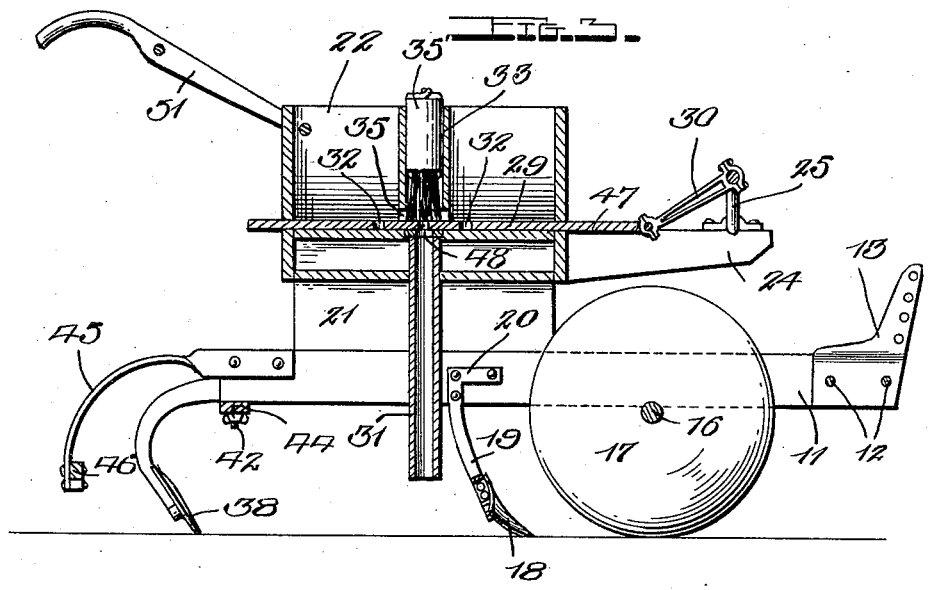
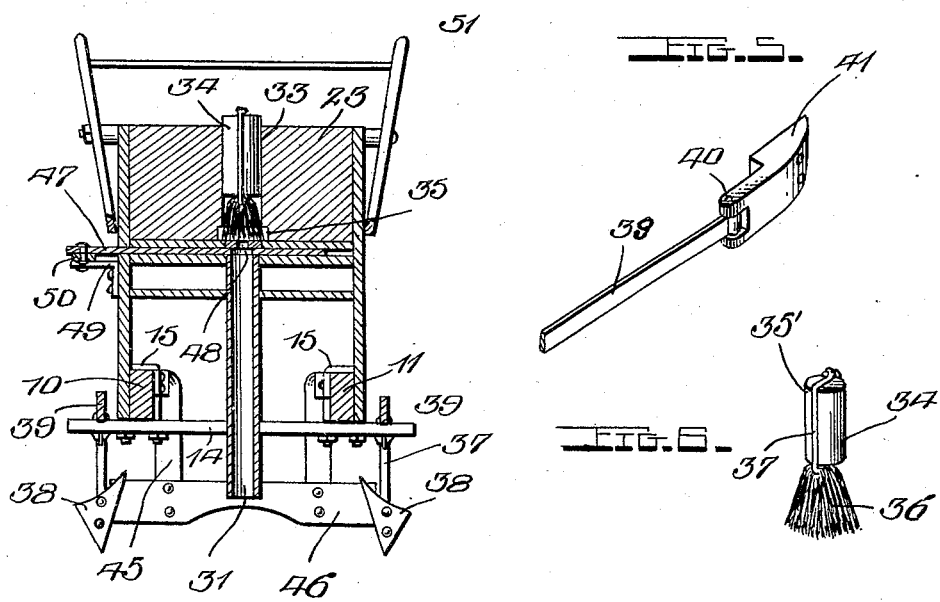
Witnesses
Chas. L. Griesbauer.
A. B. Norton.
Inventor
S. V. Brock,
By Watson E. Coleman
Attorney

UNITED STATES PATENT OFFICE.

SEYMORE V. BROCK, OF BURCH, LOUISIANA.

PLANTER.

1,074,240.  Specification of Letters Patent.  Patented Sept. 30, 1913.

Application filed July 24, 1912. Serial No. 711,374.

*To all whom it may concern:*

Be it known that I, SEYMORE V. BROCK, a citizen of the United States, residing at Burch, in the parish of Washington and State of Louisiana, have invented certain new and useful Improvements in Planters, of which the following is a specification, reference being had to the accompanying drawings.

This invention relates to an improvement in planters and the primary object of the present invention is to construct a device of this character with means for first opening the furrow and dropping the seed and the required amount of fertilizer at certain predetermined intervals within the furrows and then closing the furrows which will obviously provide a single device to perform the functions of many machines.

Other objects will appear hereinafter as the description proceeds.

With the above and other objects in view, this invention consists of the novel details of construction, combination, formation and arrangement of parts as will be hereinafter more fully described, claimed, and particularly pointed out in the accompanying drawings, in which—

Figure 1 is a side elevation of my improved planter. Fig. 2 is a top plan view of the same. Fig. 3 is a longitudinally extending section taken on the line 3—3 of Fig. 2. Fig. 4 is a transverse section taken on the line 4—4 of Fig. 1. Fig. 5 is a detail perspective view of the means for hingedly securing the furrow covering plows to the planter, and Fig. 6 is a detail perspective of the brush.

Reference now being had to the accompanying drawings wherein I have illustrated the specific embodiment of the present invention, the frame upon which the present invention is supported comprises a pair of longitudinally extending beams 10 and 11 respectively, which are curved inwardly at their forward ends and connected by means of bolts 12. A clevis 13 is mounted between the forward ends of the longitudinally extending beams whereby a suitable draft appliance may be attached thereto for propelling the planter over the field. The rearward extremities of these longitudinally extending beams are connected by a transverse bar 14 by means of the U-shaped bolts 15.

The lower faces of the longitudinally extending beams 10 and 11 are each provided with a bearing 16 mounted adjacent the forward end thereof and having journaled therein a shaft or axle 16 on which is mounted a ground wheel 17 for supporting the forward end of the planter and also for operating the dropping mechanism which will be hereinafter more fully described. Extending in the rear of this ground wheel 17 and in alinement therewith is a plow blade 18 which is used for opening the furrow before dropping the seeds. This plow blade 18 is carried by a pair of brackets 19, the upper ends of which are connected, as at 20, to the inner face of the beams 10 and 11.

Mounted upon each of the side beams 10 and 11 are a pair of parallel members 21 forming the sides of the hopper 22. This hopper is provided with a transverse member 23 which divides the same into seed and fertilizer retaining compartments.

Extending from the forward end of the hopper 22 are a pair of parallel arms 24, each of which have mounted upon the upper face thereof, bearing boxes 24' in which is journaled a transversely extending crank shaft 25. This crank shaft 25 extends parallel with the shaft 16 and each may extend beyond the side of the planter and each have mounted thereon a sprocket wheel 26 which are connected by a sprocket chain 27. Each of the compartments formed in the hopper is provided with a bottom which may curve toward the center thereof and the central portion is provided with longitudinally extending recesses 28, in which is mounted a slide 29. This slide extends through openings formed in the front and rear walls of the hopper and its forward end is connected by means of a link 30 to the crank shaft 25, whereby upon the propulsion of the planter over the field, the ground wheel will transmit a rotary motion to the crank shaft 25, as before described, which in turn will transfer a reciprocatory motion to the slide for regulating the dropping of the seed and fertilizer contained within the hopper. Depending from the medial portion of this hopper 22 is a spout 31 which directs the seed and fertilizer into the furrow formed by the plow blade 18. This spout 31 is in direct alinement with the plow blade 18 at the rear thereof so that it will direct the seed and fertilizer into the furrow, and the lower extremity thereof extends a few inches above the ground to prevent the wind from blowing the seed and fertilizer from the furrow.

The slide 29 is provided with a plurality of openings 32 which are adapted to extend into each compartment formed in the hopper and communicating with the spout 31, so that as the slide 29 is reciprocated, the seed or fertilizer which has fallen into these openings will drop into the spout and then fall in the furrows at predetermined intervals. These openings 32 formed in the slide may be of any size to receive a proper amount and size of seeds to be dropped in each hill in the furrow. The sprocket wheel mounted upon the crank shaft 25 may be of any preferred size so that as the ground wheel 17 is rotated it will cause the slide 29 to reciprocate the desired number of times, thereby increasing or diminishing the distance between the hills.

The partition 23 which divides the compartment into two sections is provided with a centrally located bore 33 in which is mounted a brush 34 adapted to engage the upper face of the slide 29. The lower edge of this partition 23 is provided with an enlarged opening 35 so that the slide 29 may reciprocate freely between the two compartments. It is a well known fact that in slides similar to the member 29 when provided with openings for directing the seed to the spout cause the seeds to engage the edge of the opening formed in the partition which causes the same to break the seed thereby injuring them and rendering them useless, and the object of the partition having an enlarged opening 35 is to allow the seed to pass freely between the slide and the partition, and the brush 34 will prevent the seeds and the fertilizer from becoming mixed together and also brushing the excess seeds and fertilizer which come between the partition 23 back into their respective compartments. This brush 34 comprises a cylindrical plug 35′ which is adapted to fit snugly in the bore formed within the partition 23 which will obviously hold the end of the bristles 36 in contact with the upper face of the slide, but, at the same time allow the cylindrical plug 35′ to be lowered in the bore when the ends of the bristles have become worn, so that they will keep in constant contact with the slide. The bristles 36 are secured to the plug 35′ by means of a piece of wire 37 which extends within recesses formed on the side of the block and are connected at their free ends upon the upper face of the block as shown.

Extending at the rear of the frame are a pair of furrow closing plows 38 which are mounted upon the rear ends of the longitudinally extending beams 39. These beams 39 are pivotally connected at their forward ends, as at 40, to blocks 41 mounted on each side of the beams 10 and 11. These beams 39 are each also provided with a depending lug 42 which are slidably mounted in elongated slots 43 formed in the transverse bar 14 and the threaded ends of these lugs 42 are each provided with a wing nut 44. It is obvious from this construction that the furrow closing plows 38 may be adjusted laterally to any desired width and held in an adjusted position by means of the wing nuts 44.

Extending from the rear extremity of the beams 10 and 11 and at the rear of the furrow closing plows are a pair of spring arms 45 which are connected by a transverse member 46 which follows the planter for covering the furrow in the usual manner.

It is obvious from the foregoing description taken in connection with the accompanying drawing that this planter may be designed for planting corn, beans, or cotton, that is, by changing the size of the openings 32 formed in the slide 29.

To cut off the flow of grain or fertilizer to the spout 31 when turning from one row to another or when the planter is not in use, I provide a slide valve which comprises a laterally sliding member 47 having formed therein an enlarged opening 48 so that when the opening 48 is in alinement with the spout, it will allow the seed and fertilizer to pass freely from the hopper to the spout and when the same is in a closed position, it will cut off all communication between the hopper and the spout.

Mounted upon the outer face of one of the members 22 of the hopper is a bracket 49 on which is fulcrumed a hand operating lever 50. This hand operating lever 50 extends longitudinally of the frame at the rear thereof and its forward end is pivotally connected to the slide 47 whereby the operator may gain access to the lever to readily operate the slide valve 47. Secured to each of the side members 22 are a pair of handles 51 by which the operator may guide the planter in the usual manner.

It is obvious from the foregoing description taken in connection with the accompanying drawing, that I have produced a planter which will be inexpensive in the cost of manufacture, strong, durable and efficient in use, and it is of course to be further understood that other minor details, and changes in construction and mode of operation may be resorted to that come within the scope of the present invention without departing from the spirit thereof.

What I claim is:—

In a planter the combination with a frame, a hopper mounted thereupon and provided with a double bottom; of a transverse partition dividing the hopper into two compartments and secured to the upper floor of the hopper bottom, a spout depending from the upper floor and through the lower floor of the bottom of the hopper, the partition having an opening forming a means of communication between the compartments and the spout, a slide adapted to reciprocate upon said upper floor and within each of said compartments and the opening formed within the partition, the partition having a centrally located vertical bore formed therein, a cylindrical plug mounted in said bore, and bristles extending from said plug and adapted to contact with the upper face of the slide, for the purpose specified.

In testimony whereof I hereunto affix my signature in the presence of two witnesses.

SEYMORE V. BROCK.

Witnesses:
J. H. BRUMFIELD,
ARLIL QUIN.

Copies of this patent may be obtained for five cents each, by addressing the "Commissioner of Patents, Washington, D. C."